United States Patent
Bourges-Sevenier et al.

(10) Patent No.: US 11,507,838 B2
(45) Date of Patent: Nov. 22, 2022

(54) METHODS AND APPARATUS TO OPTIMIZE EXECUTION OF A MACHINE LEARNING MODEL

(71) Applicant: Intel Corporation, Santa Clara, CA (US)

(72) Inventors: Mikael Bourges-Sevenier, Santa Clara, CA (US); Adam Herr, Forest Grove, OR (US); Sridhar Sharma, Palo Alto, CA (US); Derek Gerstmann, San Diego, CA (US); Todd Anderson, Hillsboro, OR (US); Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 817 days.

(21) Appl. No.: 16/456,863

(22) Filed: Jun. 28, 2019

(65) Prior Publication Data
US 2019/0325314 A1 Oct. 24, 2019

(51) Int. Cl.
*G06N 3/08* (2006.01)
*G06F 17/16* (2006.01)

(52) U.S. Cl.
CPC ............. *G06N 3/084* (2013.01); *G06F 17/16* (2013.01)

(58) Field of Classification Search
CPC .... G06N 3/084; G06N 3/0445; G06N 3/0454; G06N 3/063; G06N 3/08; G06F 17/16
See application file for complete search history.

(56) References Cited

U.S. PATENT DOCUMENTS

| | | | | |
|---|---|---|---|---|
| 2020/0380357 A1* | 12/2020 | Yao | ...... | G06N 3/084 |
| 2021/0281838 A1* | 9/2021 | Lee | ...... | H04N 19/176 |
| 2021/0295166 A1* | 9/2021 | Rouhani | ...... | G06N 3/0454 |
| 2022/0207336 A1* | 6/2022 | Kim | ...... | G06N 3/063 |

OTHER PUBLICATIONS

Gottschlich et al., "The Three Pillars of Machine Programming", ArXiv, May 8, 2018, retrieved from https://arxiv.org/pdf/1803.07244.pdf, 11 pages.
Wu et al., "Training and inference with integers in deep neural networks," arXiv preprint arXiv:1802.04680 (2018), And ICLR 2018, Feb. 13, 2018, 14 pages.

(Continued)

*Primary Examiner* — Dac V Ha
(74) *Attorney, Agent, or Firm* — Hanley, Flight & Zimmerman, LLC

(57) ABSTRACT

Methods, apparatus, systems and articles of manufacture to optimize execution of a machine learning model are disclosed. An example apparatus includes a quantizer to quantize a layer of a model based on an execution constraint, the layer of the model represented by a matrix. A packer is to pack the quantized layer of the matrix to create a packed layer represented by a packed matrix, the packed matrix having non-zero values of the matrix grouped together along at least one of a row or a column of the matrix. A blocker is to block the packed layer into a blocked layer by dividing the non-zero values in the packed matrix into blocks. A fuser is to fuse the blocked layer into a pipeline. A packager is to package the pipeline into a binary.

24 Claims, 8 Drawing Sheets

(56) References Cited

OTHER PUBLICATIONS

Github, "Model Optimization," [https://www.tensorflow.org/lite/performance/model_optimization], retrieved on Jul. 2, 2019, 3 pages.

Github, "Quantization-Aware Training," [https://github.com/tensorflow/tensorflow/blob/master/tensorflow/contrib/quantize/README.md], Feb. 1, 2019, retrieved Jul. 2, 2019, 7 pages.

Guo, Yunhui, "A survey on methods and theories of quantized neural networks." arXiv preprint arXiv:1808.04752 (2018), Dec. 16, 2018, retrieved on Jul. 2, 2019, 17 pages.

Hubara et al., "Quantized neural networks: Training neural networks with low precision weights and activations." The Journal of Machine Learning Research 18.1, Sep. 22, 2016, pp. 6869-6898, 29 pages.

Github, "Quantization in Glow," [https://github.com/tensorflow/tensorflow/blob/master/tensorflow/contrib/quantize/README.md], Mar. 12, 2018, retrieved on Jul. 2, 2019, 7 pages.

Incubator-Mxnet, "Model Quantization with Calibration Examples," [https://github.com/apache/incubator-mxnet/tree/master/example/quantization], retrieved on Jul. 2, 2019, 7 pages.

Rong, Hongbo, "Expressing Sparse Matrix Computations for Productive Performance on Spatial Architectures." arXiv preprint arXiv:1810.07517 (2018), Oct. 12, 2018, retrieved on Jul. 2, 2019, 13 pages.

Ragan-Kelley, "Halide; A language and Compiler for Optimizing Parallelism, Locality, and Recomputation in Image Processing Pipeline," Proceedings of the 34th ACM SIGPLAN Conference on Programming Language Design and Implementation, p. 519-530. New York, NY, USA, ACM, Jun. 2013, retrieved Jul. 2, 2019, 12 pages.

* cited by examiner

METHODS AND APPARATUS TO OPTIMIZE EXECUTION OF A MACHINE LEARNING MODEL

FIELD OF THE DISCLOSURE

This disclosure relates generally to machine learning, and, more particularly, to methods and apparatus to optimize execution of a machine learning model.

BACKGROUND

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

BRIEF DESCRIPTION OF THE DRAWINGS

The figures are not to scale. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Figure 1:
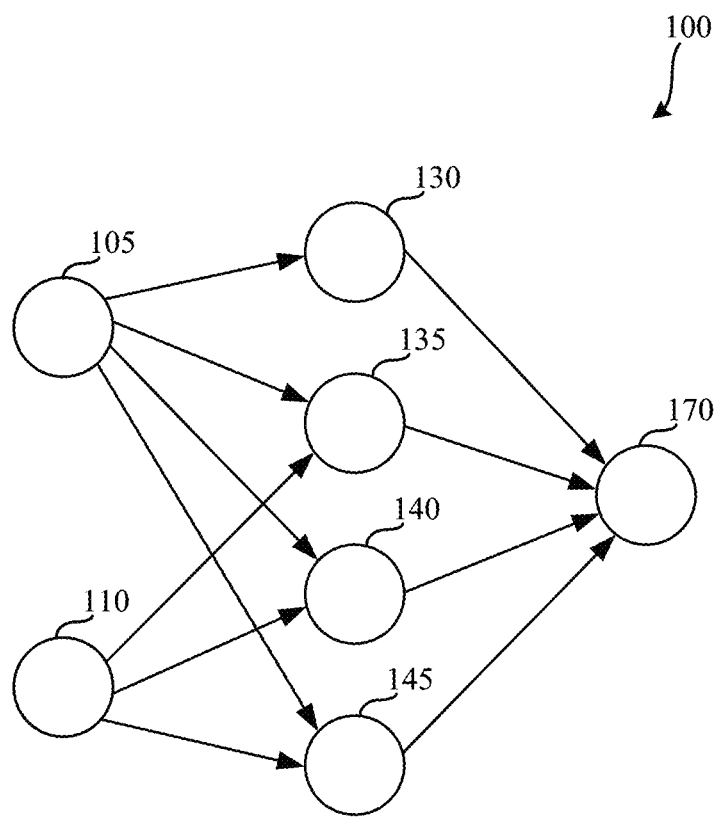
FIG. 1 is a schematic illustration of an example neural network.

Many different types of machine learning models and/or machine learning architectures exist. One particular type of machine learning model is a neural network. FIG. 1 is a schematic illustration of an example neural network 100. In the illustrated example of FIG. 1, the neural network includes an input layer including input nodes 105, 110, an intermediate layer including input nodes 130, 135, 140, 145, and an output layer including an output node 170. Without loss of generality, operations in the neural network are often similar to $y_i = \Sigma_i w_{ij} x_j$, where weighting values (w) are applied to input values (x) and summed to produce an output (y).

Different variations of neural network architectures exist. A deep neural network (DNN) is one type of neural network architecture. is a deep neural network (DNN). A DNN typically includes more than one intermediate layer. When training a DNN model, input data is transformed to some output, and a loss or error function is used to compare if the model predicts an output value close to expected value. The amount of calculated error this error is then propagated back from output to the inputs of the model using stochastic gradient descent (or another training algorithm), and the process repeats again until error is acceptably low enough or a maximum number of iterations is achieved. The parameters learned during this training process are the weights that connect each node. In some examples, hundreds, thousands, tens of thousands, etc. of nodes may be involved in the DNN.

DNN architectures are typically resilient to noise (i.e., perturbation(s) in weight values). In many DNN models in use today, weights often follow a Gaussian distribution, likely due to the Central Limit Theorem. Weights are typically represented as floating point numbers. In some examples, quantization of such weights is possible. For example, weights may be quantized to an 8-bit integer value, without an appreciable loss of accuracy of the model. Quantization results in a model that is approximately quarter the size, as compared to a model that is not quantized. More importantly, because the model uses smaller bit-widths (e.g., 8 bit values, as opposed to 16 bit, 32 bit, 64 bit, 128 bit, etc. values), the model may be executed in a more optimized fashion on hardware that supports such lower bit-width capabilities (e.g., a Field Programmable Gate Array (FPGA), a Digital Signal Processor (DSP), etc.). Such hardware typically consumes fewer hardware resources (e.g., power) and, as an added benefit, frees up compute resources of a central processor to perform other tasks. Thus, it is possible to achieve lower power (and, in some examples, higher throughput) by utilizing these quantized weights. Model size reduction is especially important for embedded devices that may have slower and/or limited processing resources. Reduction of storage, processing, and energy costs is critical on any machine.

In platforms such as FPGAs and Coarse Grained Reduced precision architecture (CGRA), it is possible to implement smaller networks using even more reduced precision (without sacrificing model accuracy). In some quantization approaches, the weight quantization is performed in the spatial domain, which could be limiting in some cases as the weight range for a particular range may be too large and quantization may result in loss of accuracy. In some other quantization approaches, even though the range of weights allows for fitting within an 8-bit range, it may be desired to reduce the weight to have even more reduced precision (e.g., fewer bits). This is the case for FPGA or CGRA and other custom accelerators.

Example approaches disclosed herein enable transformation of the weights in some layers of a neural network (or even the entire neural network) to an alternate representation so that the weighting values can be reduced. In some examples, a logarithmic scale is used for the transformation. In some other examples, other transformation representations are used such as, the frequency domain, time-frequency mapping (e.g., using wavelet transformations), etc. Such approaches utilizing alternate representations result in some increased complexity, because both the inputs and the weights need to be transformed to the alternate representation, and the transformation consumes energy. Once the transformation is done, the system needs to do as many operations in this alternate representation as possible to amortize the transformation overhead across as many operations as possible.

In examples disclosed herein, applying quantization to a model may lead to weight and/or activation matrices including many zeros (e.g., connections between the previous functions and the current function are cut). In some examples, rearranging the weight or activation matrices leads to simpler processing. For example, instead of a dense matrix multiplication or General Matrix Multiply (GEMM) operation, quantization could lead to a band-diagonal matrix, a special sparse matrix structure, which results is faster and efficient GEMM operation and in a smaller storage requirements. In some examples, shuffling connections around, from one function to another, leads to more efficient model representation (e.g., in a simpler computation graph). In examples disclosed herein, the choice of whether to perform a transformation to operate in the time domain or after applying time-frequency transformation may be made based on the sparsity of the matrix.

Figure 2:
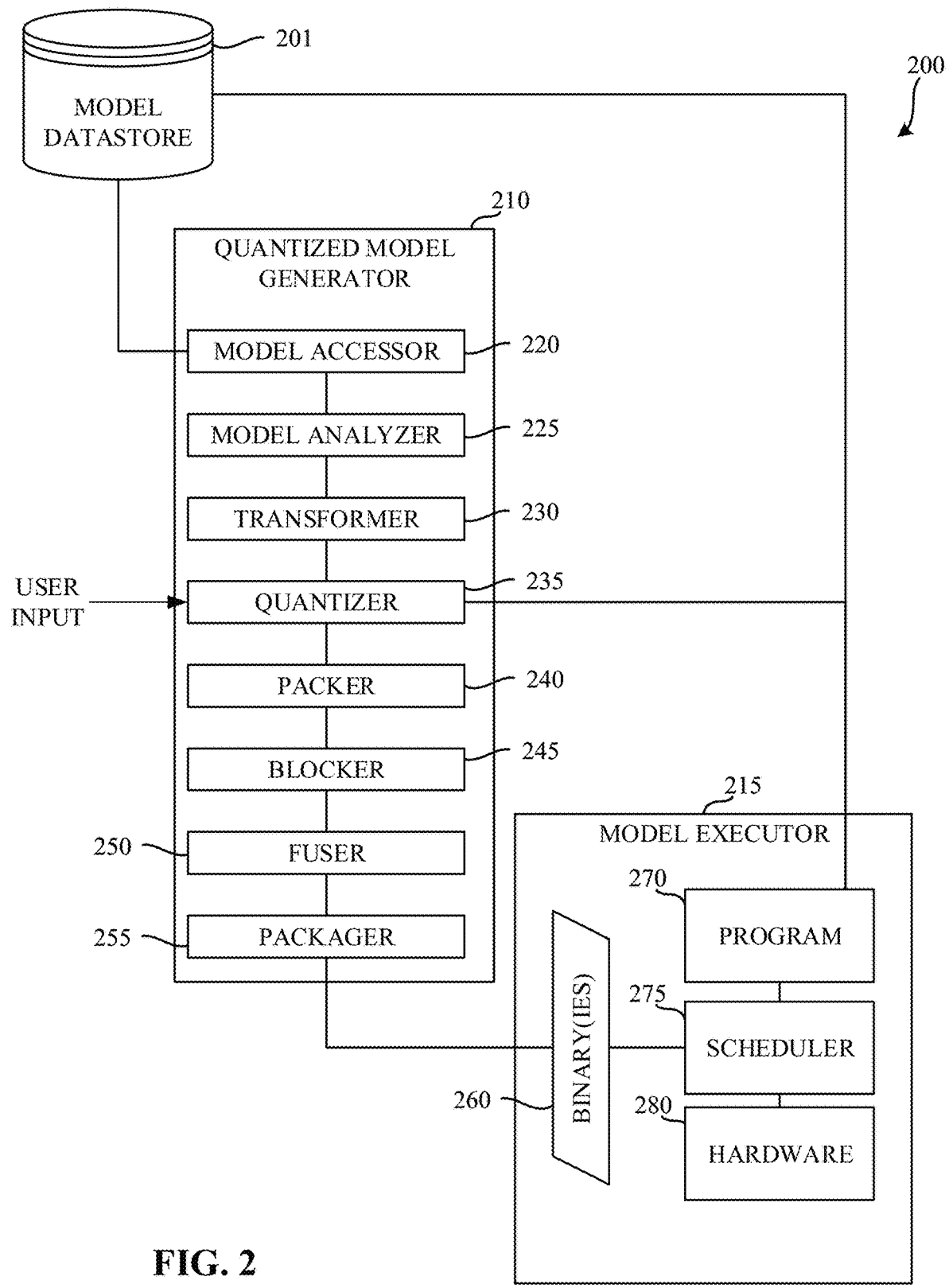
FIG. 2 is a block diagram of an example system for optimizing execution of a machine learning model.

FIG. 2 is a block diagram of an example system for optimizing execution of a machine learning model. The example system 200 of the illustrated example of FIG. 2 includes a model data store 201, a quantized model generator 210, and a model executor 215. The example model data store 201 stores machine learning models for execution by the example model executor 215.

The example quantized model generator 210 includes a model accessor 220, a model analyzer 225, a transformer 230, a quantizer 235, a packer 240, a blocker 245, a fuser 250, and a packager 255. The example quantized model generator 210 accesses model(s) stored in the model data store 210 and optimizes the model binary(ies) 260 for execution by the model executor 215.

The example model executor 215 includes a program 270, a scheduler 275, and hardware 280. In some examples, the model executor 215 is implemented by a same hardware device as the quantized model generator 210.

The example model data store 201 of the illustrated example of FIG. 2 is implemented by any memory, storage device and/or storage disc for storing data such as, for example, flash memory, magnetic media, optical media, solid state memory, hard drive(s), thumb drive(s), etc. Furthermore, the data stored in the example model data store 201 may be in any data format such as, for example, binary data, comma delimited data, tab delimited data, structured query language (SQL) structures, etc. While, in the illustrated example, the model data store 201 is illustrated as a single device, the example model data store 201 and/or any other data storage devices described herein may be implemented by any number and/or type(s) of memories. In the illustrated example of FIG. 2, the example model data store 201 stores machine learning models that are to be executed by the model executor 215. The stored machine learning models may be of any machine learning architecture(s) such as, for example, a neural network, a deep neural network (DNN), a recurrent neural network (RNN), a convolutional neural network (CNN), etc.

The example quantized model generator 210 is implemented by a server such as, for example, a cloud-computing server. However, any other type of computing device may additionally or alternatively be used. The example model generator 210 accesses a model stored in the example model data store 201, and optimizes the model for execution by the model executor 215.

The example model accessor 220 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc.

The example model accessor 220 accesses a model to be optimized from the example model data store 201. In examples disclosed herein, the model is represented as Tensor Algebra expressions (i.e. mathematical formula acting on n-dimensional arrays). The example model accessor 220 may access the model in response to, for example, an instruction from a user, an indication from the program that a particular model is to be executed, etc.

The example model analyzer 225 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example model analyzer 225 analyzes the trained parameters/activations of the model accessed by the model accessor 220 to infer weighting magnitude(s) from the model.

The example transformer 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example transformer 230, in some examples, performs a transformation on the model. In some examples, such a transformation transforms the model to operate on a logarithmic scale. In some other examples, the transformation transforms the model to operate in the frequency domain or some other time-frequency mapping using wavelet transformations.

The example quantizer 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example quantizer 235 identifies constraints associated with execution of the model. In examples disclosed herein, the constraints may be user-supplied constraints (e.g., energy consumption preferences, preferences for executing on particular hardware, etc.). In some examples, the constraints represent hardware constraints (e.g., bit-width capabilities, memory limitations, whether fast instructions of 8-bit values is enabled, vectorization, tiling, ALU vs. FPU performance, etc.). The example quantizer 235 identifies (e.g., selects) a layer of the model for processing, and performs quantization of the layer based on the constraints.

Quantization maps a dense matrix M into a sparse matrix M' where only non-zero elements contribute to $y'_i$. Hardware accelerators such as the hardware 280 support execution of vectorization and/or tiling instructions favoring 1D and/or 2D spatial memory arrangements, respectively. In examples disclosed herein, a symmetric linear quantization function is used. However, any other quantization scheme may additionally or alternatively be used. In some examples, before applying the quantization function, the value distribution of each operand (e.g., within a DNN model layer) are shifted to an appropriate order of magnitude. Quantization is applied to multiple properties of the layer(s) of the model, including Weights, Activations, Gradients, and Error/loss functions (sometimes referred to as "WAGE"). In some examples, quantization may also be used in the context of progressive training, where loss functions are applied in blocks, not only at the end of a model. In some examples, quantization may be applied to hyper-parameters of the model, such that those quantized hyper-parameters are used in subsequent training of the model. For example, a hyper-parameter controlling how much sparsity in the model is targeted may be quantized which, in turn, benefits future quantization operations.

The example packer 240 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example packer 240 performs packing of the quantized layer. Packing puts the non-zeros of the matrix together along at least one of the rows or the column of the matrix.

The example blocker 245 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example blocker 245 performs blocking of the packed layer. Blocking divides the non-zeros in the matrix into blocks.

The example fuser 250 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example fuser 250 fuses one or more quantized/packed/blocked layers of the model into a pipeline. In examples disclosed herein, the pipeline is implemented using a separation of concern domain-specific languages (DSL). In examples disclosed herein, a Halide programming language is used. However, any other programming language may additionally or alternatively be used. DSL type languages enable algorithms to be described independently from the organization of their execution, offering a clear separation between what the algorithm does and how specifically it accomplishes this hardware (e.g., the schedule). In particular, a Halide philosophy on describing compute problems is to separate an algorithm (e.g., composition of mathematical functions in a device-independent manner) from its schedule (e.g., a device-specific data flows between functions).

The example packager 255 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example packager 255 packages the binary 260 with additional metadata. The example packager 255 outputs a machine binary (e.g., an executable model) that can be linked with the program binary (producing a "fat" binary) ahead-of-time (AOT), or dynamically using Just-in-Time (JIT) compilation and stored in a cache or filesystem. In some examples, multiple machine binaries are created, corresponding to portions of the model. The example machine binary represents tasks that must be executed in a specific order, synchronously or asynchronously, and on multiple devices. This process reduces model storage size and also improves compute performance by reducing data movement for a specific device and this helps compilers produce more optimal code with their standard optimization passes.

In the illustrated example of FIG. 2, the example packager 255 provides the binary(ies) 260 to the model executor 215 for execution. However, in some examples, the binary(ies) may be stored in the model datastore 201 to enable subsequent (e.g., later) execution of the quantized model by the model executor 215. Such an approach enables the binary(ies) to be distributed to multiple different model executors (e.g., edge devices) with similar hardware resources 280. In this manner, the benefits of quantization may be realized by multiple model executor devices 215.

Example model executor 215 of the illustrated example of FIG. 2 represents a computing device that is to utilize a machine learning model to perform some task. The example model executor 215 may be implemented by, for example, a laptop computer, a desktop computer, a smart phone, an internet of things (IoT) device, an embedded device, etc. As noted above, the example model executor 215 includes the program 270, the scheduler 275, and the hardware 280.

The program 270 the illustrated example of FIG. 2 represents an application that is to use the result of the machine learning model to perform some task (e.g., image recognition, data classification, etc.). The example program 270 may, for example, pre-process input data to extract features used by the machine learning model, cause the scheduler 275 to execute the model (e.g., via the binary(ies) 260), and/or may post-process a result to effectuate a result of the execution of the machine learning model.

The example scheduler 275 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example scheduler 275 inspects the binary(ies) 260 provided by the example packager 255 and schedules portions thereof for execution on the example hardware 280. In examples disclosed herein, the example scheduler 275 uses the additional metadata embedded by the packager 255 to coordinate decisions on which devices, with which resources, for what expected quantization error, and so on, tasks should be executed. Such metadata includes, for example, a hardware description on which the model and/or portions thereof can be executed, estimated memory requirements for the model and/or portions thereof, number of processing units required to execute the model and/or portions thereof, a quantization error for the model and/or portions thereof, etc. This metadata is extensible and is used by the scheduler 275 to determine how to execute tasks, on which hardware and with which resource requirements.

The example hardware 280 of the illustrated example of FIG. 2 represents any type of hardware that may be used to execute a machine learning model and/or portion thereof. The example hardware may include, for example, one or more analog or digital circuit(s), logic circuits, programmable processor(s), ASIC(s), PLD(s), FPLD(s), programmable controller(s), GPU(s), DSP(s), ISP(s), CGRA(s), etc. The example hardware 280 executes the machine learning model and/or a portion thereof at the direction of the scheduler 275.

Figure 3:
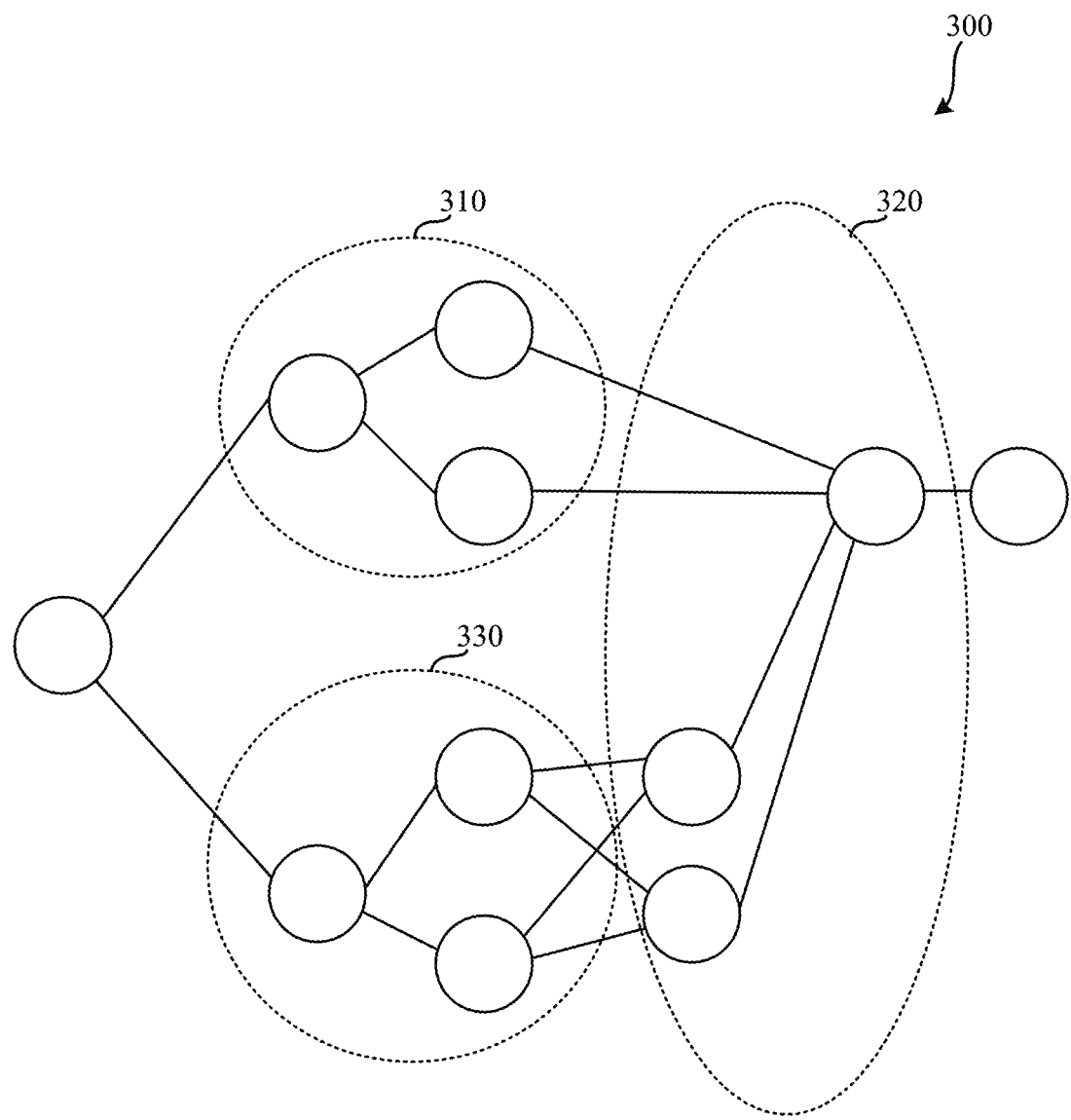
FIG. 3 is a schematic illustration of an example neural network having groups of nodes to be executed by heterogeneous hardware.

FIG. 3 is a schematic illustration of an example neural network 300 having groups of nodes to be executed by heterogeneous hardware. The example neural network 300 of FIG. 3 includes a first group of nodes 310, a second group of nodes 320, and a third group of nodes 330. In a heterogeneous system, a DNN model may run on multiple different hardware devices. The example program 270 typically ships with (and/or accesses) a trained model with a generic precision that can be split, quantized, and/or compressed for all devices it runs on that system. Based on the complexity of data movement and arithmetic throughput of each device, portions of the model (e.g., groups of nodes, layers, etc.) can be executed in parallel to hide data transfer latency between memory sub-systems (e.g., through pipelining techniques). Such an approach enables higher performance than executing the model on one device. Thus, execution of the first group of nodes 310, and the third group of nodes 330 may be performed in parallel.

In some examples, portions of the model may be more efficiently executed by different devices. Such devices may use low-precision data representations for example as in fixed-point arithmetic. In the illustrated example of FIG. 3, the first group of nodes 310 is executed by a central processing unit (CPU). The second group of nodes 320 is executed by a graphics processing unit (GPU). The third group of nodes 330 is executed by a digital signal processor (DSP). Thus, when input data is received (e.g., image data from a camera sensor), the RAW values may be quantized as 10-bit or 12-bit wide, a non-standard bit-width for CPU and GPU devices, but which is a bit width that ISP and DSP devices can process efficiently for convolutions and other signal processing operations found in DNN models. These hardware blocks can be used as part of the model and their quantization constraints propagated to the rest of the network such that the DNN model performs the fastest way possible and, in this case, even at lower power consumption.

While an example manner of implementing the example quantized model generator 210 is illustrated in FIG. 2, one or more of the elements, processes and/or devices illustrated in FIG. 2 may be combined, divided, re-arranged, omitted, eliminated and/or implemented in any other way. Further, the example model accessor 220, the example model analyzer 225, the example transformer 230, the example quantizer 235, the example packer 240, the example blocker 245, the example fuser 250, the example packager 255 and/or, more generally, the example quantized model generator 210 of FIG. 2 may be implemented by hardware, software, firmware and/or any combination of hardware, software and/or firmware. Thus, for example, any of the example model accessor 220, the example model analyzer 225, the example transformer 230, the example quantizer 235, the example packer 240, the example blocker 245, the example fuser 250, the example packager 255 and/or, more generally, the example quantized model generator 210 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example model accessor 220, the example model analyzer 225, the example transformer 230, the example quantizer 235, the example packer 240, the example blocker 245, the example fuser 250, the example packager 255 and/or, more generally, the example quantized model generator 210 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example quantized model generator 210 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
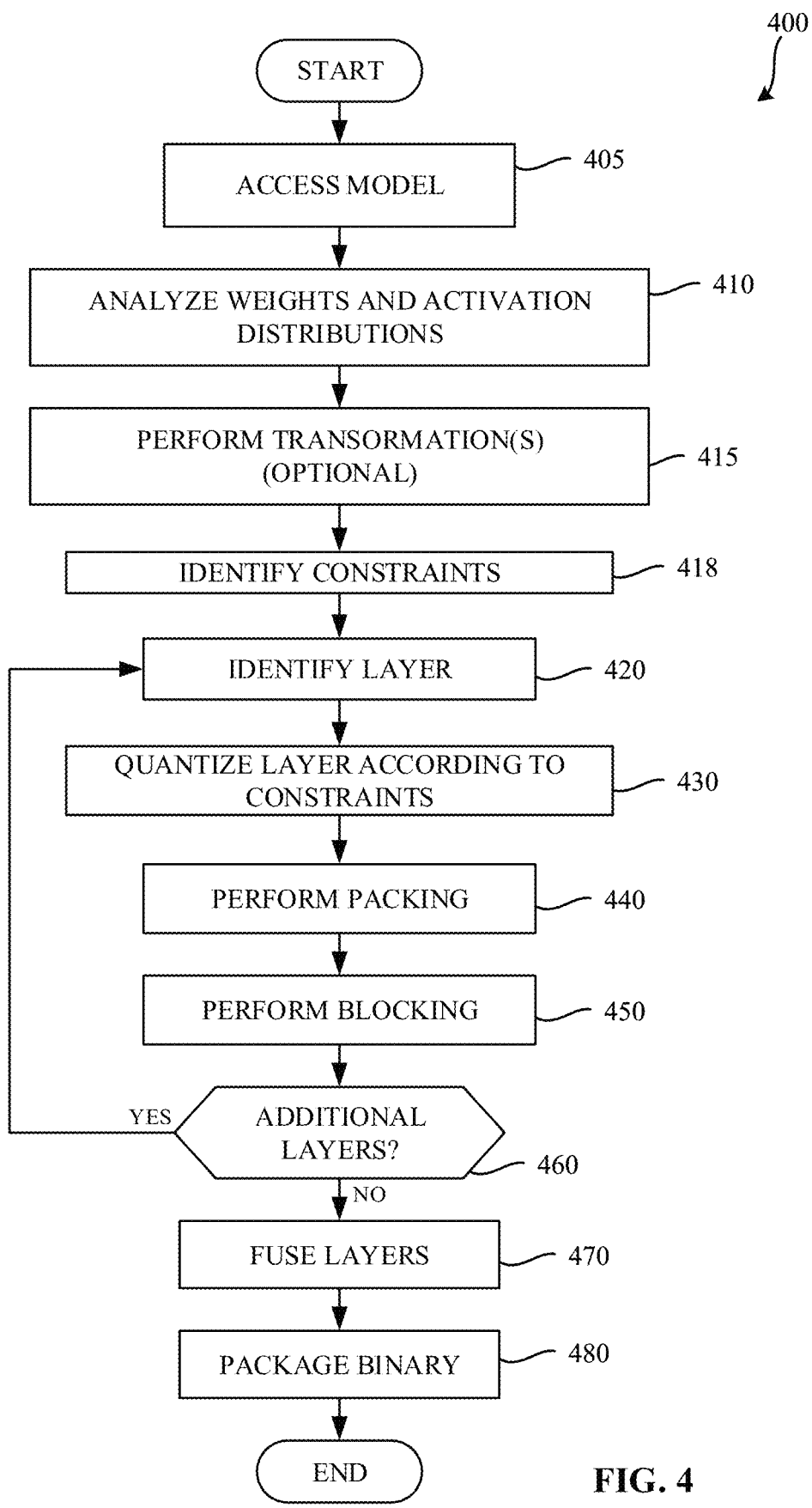
FIG. 4 is a flowchart representative of machine readable instructions which may be executed to implement the example quantized model generator of FIG. 2.

A flowchart representative of example hardware logic, machine readable instructions, hardware implemented state machines, and/or any combination thereof for implementing the quantized model generator 210 of FIG. 2 is shown in FIG. 4. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 4, many other methods of implementing the example quantized model generator 210 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, Halide, etc.

As mentioned above, the example process of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine readable instructions which may be executed to implement the example quantized model generator of FIG. 2. The example process 400 of FIG. 4 begins when the example model accessor 220 accesses a model to be optimized. (Block 405). In examples disclosed herein, the model is represented as Tensor Algebra expressions (i.e. mathematical formula acting on n-dimensional arrays). The example model analyzer 225 analyzes the trained parameters/activations of the model to infer weighting magnitude(s). (Block 410). In some examples, a transformation is performed by the example transformer 230. (Block 415). In some examples, the transformation transforms the model to operate on a logarithmic scale. In some examples, the transformation transforms the model to operate in the frequency domain or some other time-frequency mapping using wavelet transformations.

The example quantizer 235 identifies constraints associated with execution of the model. (Block 418). In examples disclosed herein, the constraints may be user-supplied constraints (e.g., energy consumption preferences, preferences for executing on particular hardware, etc.). In some examples, the constraints represent hardware limitations (e.g., bit limitations, memory limitations, whether fast instructions of 8-bit values is enabled, vectorization, tiling, ALU vs. FPU performance, etc.). The example quantizer 235 identifies (e.g., selects) a layer of the model for processing. (Block 420).

The example quantizer 235 performs quantization of the layer based on the constraints. (Block 430). Quantization maps a dense matrix M into a sparse matrix M' where only non-zero elements contribute to $y'_i$. Hardware accelerators contain vectorization and tiling instructions favoring 1D or 2D spatial memory arrangements respectively. In examples disclosed herein, a symmetric linear quantization function is used. However, any other quantization scheme may additionally or alternatively be used. In some examples, before applying the quantization function, the values distribution of each operand (e.g., within a DNN model layer) are shifted to an appropriate order of magnitude.

In examples disclosed herein, symmetric linear mid-tread quantization is used. Using this quantization approach ensures that the connectivity of the neural network is preserved up to the quantization efficiency. Specifically, 0 parameter values in a DNN model layer means a connection with previous layer is cut, and must be preserved. Example approaches disclosed herein are also applicable to other quantization schemes, so long as parameters, inputs, and functions used in a layer are properly shifted and scaled to preserve this 0-value property.

The example packer 240 then performs packing of the quantized layer. (Block 440). Packing puts the non-zeros of the matrix together along the rows or column of the matrix. The example blocker 245 then performs blocking of the packed layer. (Block 450). Blocking divides the non-zeros into blocks. Job scheduling schedules the non-zeros in rows, columns, or blocks, as jobs to some "machines", which are hardware units with identical logic and will process the non-zeros in parallel. In examples disclosed herein, packing and blocking operations are operations on the indices of sub-matrices of W and X. These re-ordered sub-matrices multiplications and additions can then be executed in parallel.

The example quantizer 230 determines whether there are any additional layers for processing. (Block 460). If additional layers exist for processing (e.g., block 460 returns a result of YES), control proceeds to block 420, where blocks 420 through 460 are repeated until no additional layers are to be processed (e.g., until block 460 returns a result of NO). The example fuser 250 then fuses one or more quantized/packed/blocked layers of the model. (Block 470).

In examples disclosed herein, the layers are fused into a pipeline. In examples disclosed herein, the pipeline is implemented using a separation of concern domain-specific languages (DSL). In examples disclosed herein, a Halide programming language is used. However, any other programming language may additionally or alternatively be used. DSL type languages enable algorithms to be described independently from the organization of their execution, offering a clear separation between what the algorithm does and how specifically it accomplishes this hardware (e.g., the schedule). In particular, a Halide philosophy on describing compute problems is to separate an algorithm (e.g., composition of mathematical functions in a device-independent manner) from its schedule (e.g., a device-specific data flows between functions).

Typically, the scheduling side of these DSLs offer a suite of operations that perform various transforms including altering access patterns (e.g., splitting, fusing, tiling, unrolling), concurrent execution (e.g., parallelization, vectorization, general purpose graphics processing unit (GPGPU) blocks/thread, etc.) memory related operations (memorize, reordering storage, etc.), etc. When such algorithms are composed into larger pipelines, the scheduling language (e.g., Halide) can be used to describe where computations happen, and where results are stored (compute/storage root, compute/store at a particular loop-nest dimension).

In examples disclosed herein (e.g., utilizing Halide), the default behavior is to include (fuse) all algorithmic stages together into a single computation. A "compute root" can be used in the schedule to create an intermediate result for a given stage, which creates a temporary buffer which is populated by the execution the subsequent stage. This is typically done to improve the memory locality of later computations, since fusing many computations together can result in pathological access patterns and poor performance. Example approaches disclosed herein utilize a variation on the "compute root" architecture, which better handles quantization.

When the fuser 250 fuses the layers into a pipeline, a quantization root (q-root) can be inserted (e.g., in the same fashion as a compute root may be inserted). In contrast to the compute root, in a quantization root, only the resulting buffer is based on a specified set of quantization functions. When a quantization root is used, the intermediate buffer data is quantized and packed (e.g., based on quantization results) into a memory layout that may differ from the original algorithmic bounds. For example, a quantization function may result in a large number of zero values. If it is known that subsequent processing of zero values will always accumulate to zero results, culling out these zero inputs in subsequent stages would result in reduced processing overheads.

Culling out of those zero inputs is accomplished by the fuser 250 by converting the sparse representation of a computation into a dense representation of the intermediate result. There are scenarios where the sparse data representation can be carried forward across multiple layers of a network. After quantization stage there may be additional elements that become zero and need to be culled. Similarly, there may be more non-zero elements that need to be added to the sparse data structure.

When it is determined that the subsequent stages won't need this derived sparse layout, a mapping function is used to resolve memory access from quantized and re-packed intermediate. The conversion back to dense matrix representation may be done by specifying a compute root scheduling directive. In any case the conversion will always be done at the final output stage of the pipeline. Mapping from the dense representation to a sparse representation can be specified by adding a parameter to the quantization root directive indicating a sparse matrix is preferred if there is enough sparsity after quantization. An explicit directive to do the conversion can always be added, if desired.

Such fusion approaches make quantization and data-reordering transparent to the user, and thus preserves the simplicity of the DSL, by allowing quantization and data reduction as a "drop-in" feature of in the arsenal of scheduling primitives. The quantization root directive can also be used to specify the cast of the weights to a particular data type at each layer of the network such as float32, float1, bfloat16, int8, int4, etc.

In some examples, a similar approach can be applied when a transformation needs to be done on the weights and inputs. A transformation root (which is an extension of a compute root) can be used. The transformation root directive causes the scheduler 275 to generate one or more intermediate buffers, where the transformed weights and input (intermediate) data will be packed. The transformed data may be used for multiple layers. In some examples, the transformed data can be discarded once the data is transformed back to the original domain.

As described above, techniques such as packing, blocking, fusion reduce the code for that specific hardware. The example packager 255 packages the binary 260 with additional metadata. (Block 480). The example packager 255 outputs a machine binary (e.g., an executable model) that can be linked with the program binary (producing a "fat" binary) ahead-of-time (AOT), or dynamically using Just-in-Time (JIT) compilation and stored in a cache or filesystem. In some examples, multiple machine binaries are created, corresponding to portions of the model. The example machine binary represents tasks that must be executed in a specific order, synchronously or asynchronously, and on multiple devices.

The additional metadata enables the scheduler 275 to coordinate decisions on which devices, with which resources, for what expected quantization error, and so on, tasks should be executed. Such metadata includes, for example, a hardware description on which the model and/or portions thereof can be executed, estimated memory requirements for the model and/or portions thereof, number of processing units required to execute the model and/or portions thereof, a quantization error for the model and/or portions thereof, etc. This metadata is extensible and is used by the scheduler 275 to determine how to execute tasks, on which hardware and with which resource requirements.

In examples disclosed herein, the example packager 255 generates multiple binaries for multiple corresponding hardware(s). Generating multiple binaries enables the scheduler 275 to monitor availability and/or throughput of the hardware 280, and select appropriate binary to run on the best available hardware.

Figure 5:
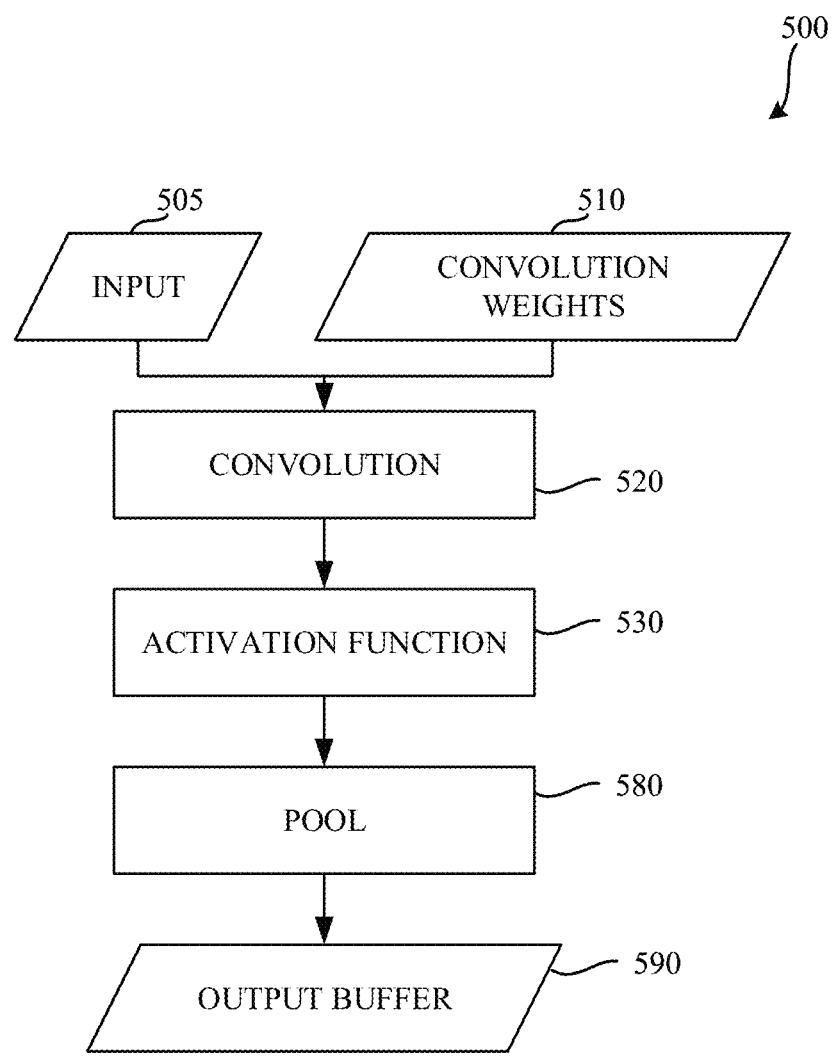
FIG. 5 is a block diagram representing an example pipeline algorithm.

FIG. 5 is a block diagram representing an example pipeline algorithm 500. The example pipeline algorithm 500 receives an input 505 and convolution weights 510. The example pipeline then processes the inputs and weights using a convolution function 520, an activation function 530, and a pooling function 580, to create an output stored in an output buffer 590. The functions 520, 530, 580 are implemented using Halide functions. However, any other programming language may additionally or alternatively be used.

Figure 6:
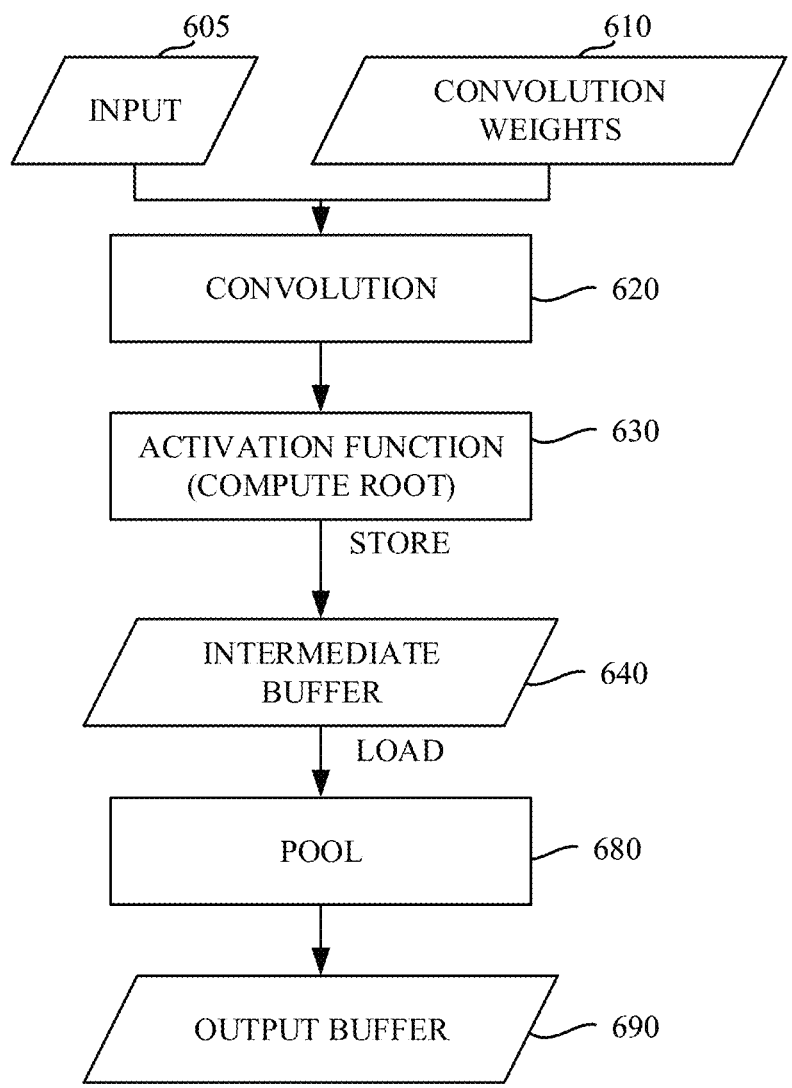
FIG. 6 is a block diagram representing an example pipeline algorithm with a compute root.

FIG. 6 is a block diagram representing an example pipeline algorithm 600 with a compute root. The example pipeline algorithm 600 receives an input 605 and convolution weights 610. The example pipeline then processes the inputs and weights using a convolution function 620, an activation function 630, and a pooling function 680, to create an output stored in an output buffer 690. FIG. 6 builds upon FIG. 5, and indicates that the activation function 630 is scheduled as a compute root. In this manner, the convolution function and activation function are fused together to produce an intermediate buffer 640 between the activation function 630 and pooling function 680.

Figure 7:
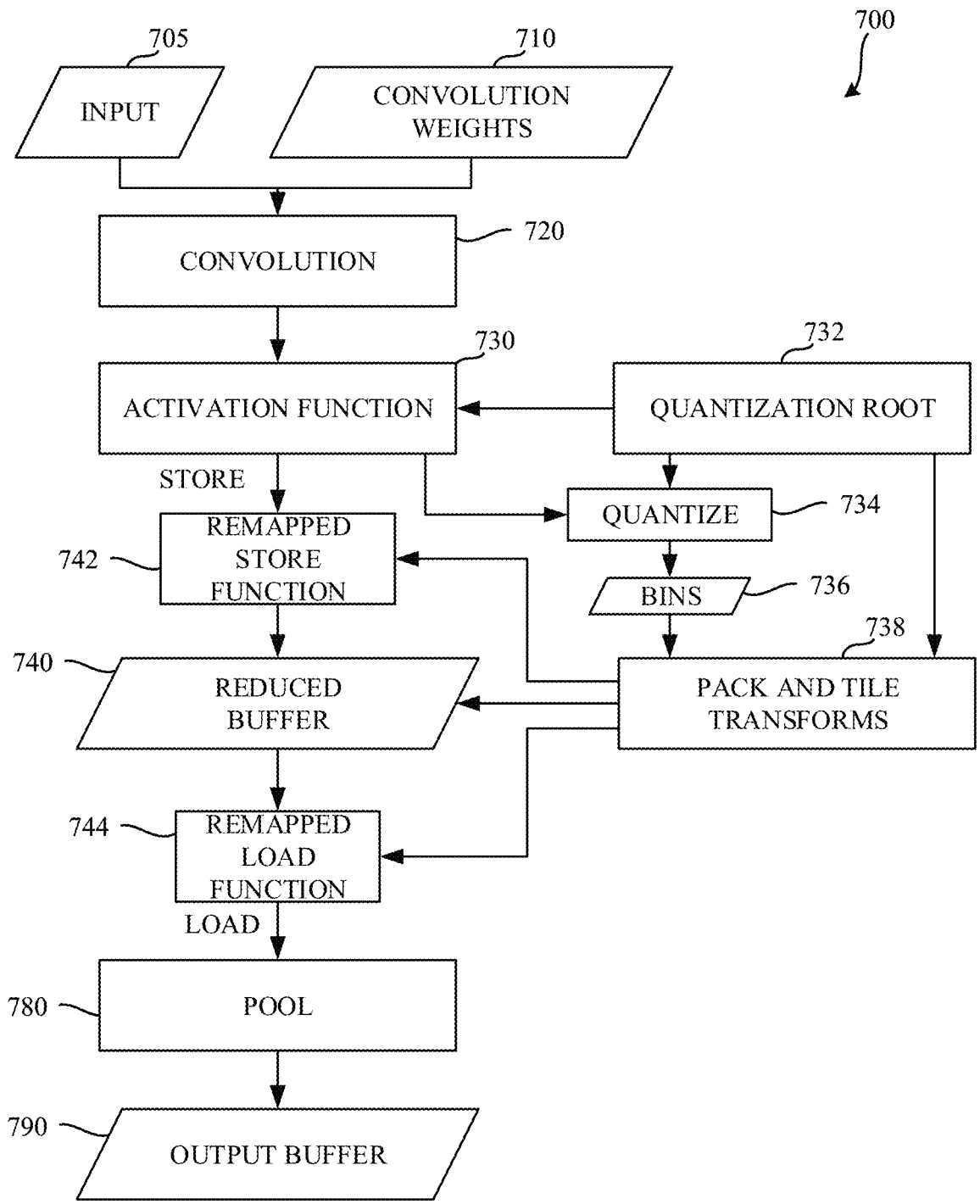
FIG. 7 is a block diagram representing an example pipeline algorithm with a quantization root.

FIG. 7 is a block diagram representing an example pipeline algorithm 700 with a quantization root. The example pipeline algorithm 700 receives an input 705 and convolution weights 710. The example pipeline 700 then processes the inputs and weights using a convolution function 720, an activation function 730, and a pooling function 780, to create an output stored in an output buffer 790. The example activation function 730 is scheduled as a quantization root 732. As noted above, the quantization root performs a similar function as a compute root (of FIG. 6), except the intermediate buffer size may be reduced through the quantization and pack/tile transformations. Here, the general flow described requires partial just-in-time (JIT) computation of the graph, since the actual values of a given layer must be realized to perform quantization. When the activation function has a quantization root 732 applied, the outputs of the activation function are realized to a temporary buffer and are passed through a quantization function 734 specified by the scheduling call.

The quantization function 734 is applied to the layer data to create a set of bins 736. Next, a set of packing and tile transformations 738 (also provided by the scheduling call) are applied. The packing decision can be based on bin values (e.g., stored in the bins 736), such that particular bins can be selected for particular packing/tiling modes. In the illustrated example of FIG. 7, one or more values are culled from the packed representation (e.g., the values in the zero bin). The buffer size of the intermediate buffer (e.g., the intermediate buffer 640 from FIG. 6) will be reduced by the number of ordered tuples that fall within the zero bin, which defines the new bounds of the intermediate, reduced buffer 740. The indices of the algorithmic definition of the activation function are then remapped to the new layout using a remapped storage function 742, such that stores are packed into the reduced buffer 740 with the unwanted data culled out.

The indices of the algorithmic definition of the subsequent pooling stage are likewise remapped using a remapped loading function 744, such that the pooling function 780 correctly loads data out of the reduced buffer 740. In some examples, once the quantization has been performed for a given layer, the remapping functions 742, 744 are "baked" into the pipeline and the quantization process is not invoked unless explicitly told to do so. Prior to quantization, the bounds of the intermediate buffer are undefined, so the pipeline will need to be recompiled for each quantization root in the schedule.

Figure 8:
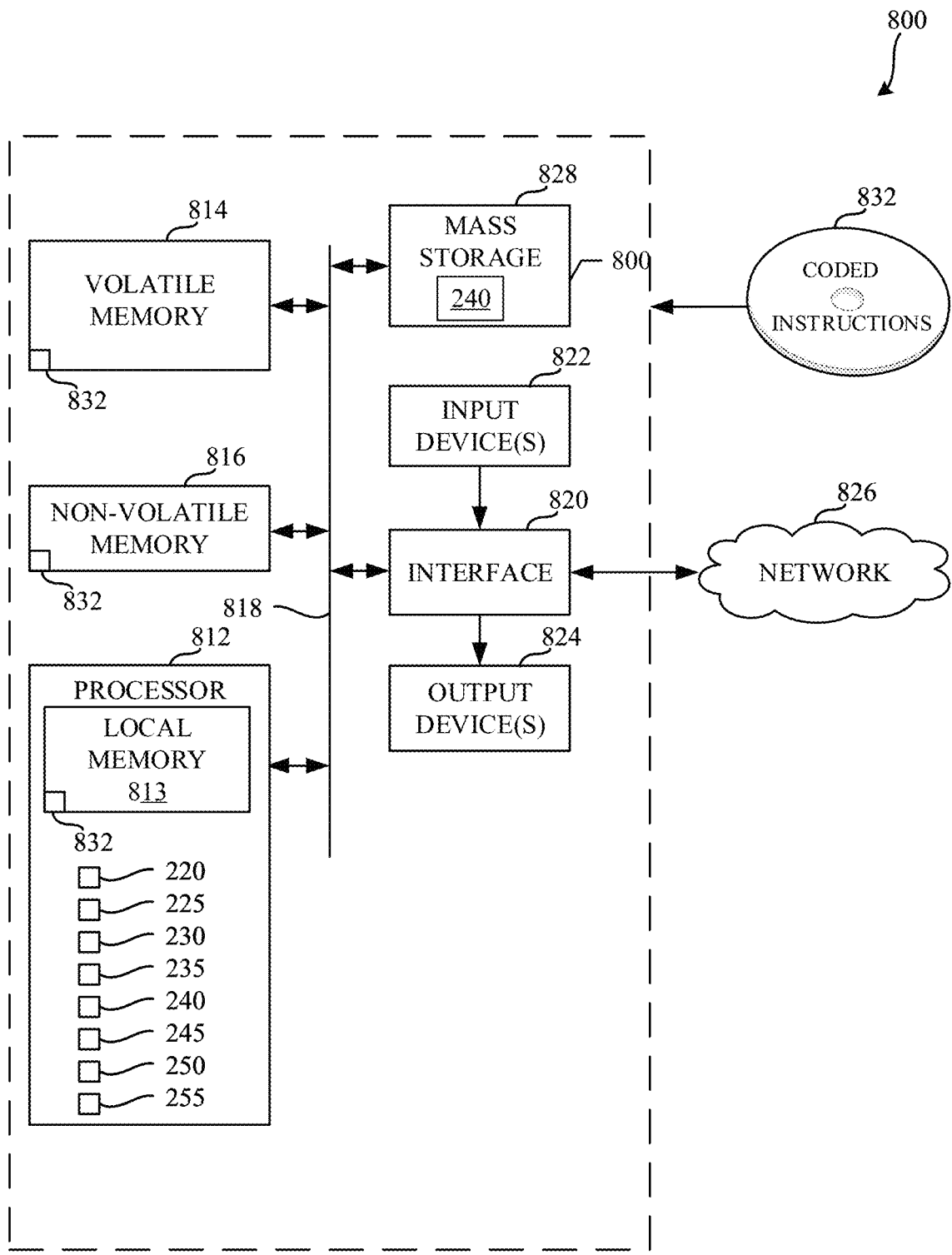
FIG. 8 is a block diagram of an example processing platform structured to execute the instructions of FIG. 4 to implement the example quantized model generator of FIG. 2.

FIG. 8 is a block diagram of an example processor platform 800 structured to execute the instructions of FIG. 4 to implement the quantized model generator 210 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example model accessor 220, the example model analyzer 225, the example transformer 230, the example quantizer 235, the example packer 240, the example blocker 245, the example fuser 250, and the example packager 255.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 4 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable execution of a machine learning model to be optimized. The disclosed methods, apparatus and articles of manufacture improve the efficiency of using a computing device by quantizing parameters of DNN models and enabling efficient scheduling of operations based on hardware-specific features. Using examples disclosed herein, models can be executed by disparate hardware resources, thereby enabling model execution to leverage additional hardware resources on a system, thereby increasing throughput of the execution of the model. As a result, complex DNN models can be executed on devices with fewer hardware resources, enabling smaller and/or lower-power devices to be used to execute a machine learning model. Moreover, DNN model execution can be adapted to hardware changes at the device executing the model. For example, hardware changes a power state (e.g., for preserving battery), the model may be executed by a different hardware device and/or may adapt quality (e.g., levels of quantization) of the model to preserve real-time performance. The disclosed methods, apparatus and articles of manufacture are accordingly directed to one or more improvement(s) in the functioning of a computer.

Example 1 includes an apparatus to optimize execution of machine learning models, the apparatus comprising a quantizer to quantize a layer of a machine learning model based on an execution constraint, the layer of the machine learning model represented by a matrix, a packer to pack the quantized layer of the matrix to create a packed layer represented by a packed matrix, the packed matrix having non-zero values of the matrix grouped together along at least one of a row or a column of the matrix, a blocker to block the packed layer into a blocked layer, the blocking performed by dividing the non-zero values in the packed matrix into blocks, a fuser to fuse the blocked layer into a pipeline, and a packager to package the pipeline into a binary.

Example 2 includes the apparatus of example 1, wherein the execution constraint is a hardware constraint.

Example 3 includes the apparatus of example 2, wherein the hardware constraint represents a bit-width capability of a hardware device that is to execute the machine learning model.

Example 4 includes the apparatus of example 1, wherein the fuser is further to insert a quantization root into the pipeline.

Example 5 includes the apparatus of example 4, wherein the quantization root is to cause a scheduler to quantize a result of an activation function into a set of bins, pack the values of the bins to create a reduced buffer, and provide the reduced buffer to a pooling function via a remapped load function.

Example 6 includes the apparatus of example 1, further including a transformer to perform a transformation of the layer of the machine learning model prior to the quantizer quantizing the layer.

Example 7 includes at least one non-transitory machine readable storage medium comprising instructions that, when executed, cause at least one processor to at least quantize a layer of a machine learning model based on an execution constraint, the layer of the machine learning model represented by a matrix, pack the quantized layer of the matrix to create a packed layer represented by a packed matrix, the packed matrix having non-zero values of the matrix grouped together along at least one of a row or a column of the matrix, block the packed layer into a blocked layer, the blocking performed by dividing the non-zero values in the packed matrix into blocks, fuse the blocked layer into a pipeline, and package the pipeline into a binary.

Example 8 includes the at least one machine readable storage medium of example 7, wherein the execution constraint is a hardware constraint.

Example 9 includes the at least one machine readable storage medium of example 8, wherein the hardware constraint represents a bit-width capability of a hardware device that is to execute the machine learning model.

Example 10 includes the at least one machine readable storage medium of example 7, wherein the instructions, when executed, further cause the at least one processor to insert a quantization root into the pipeline.

Example 11 includes the at least one machine readable storage medium of example 10, wherein the quantization root is to cause a scheduler to quantize a result of an activation function into a set of bins, pack the values of the bins to create a reduced buffer, and provide the reduced buffer to a pooling function via a remapped load function.

Example 12 includes the at least one machine readable storage medium of example 7, wherein the instructions, when executed, cause the at least one processor to perform a transformation of the layer of the machine learning model prior to the quantization of the layer.

Example 13 includes a method to optimize execution of machine learning models, the method comprising quantizing a layer of a machine learning model based on an execution constraint, the layer of the machine learning model represented by a matrix, packing the quantized layer of the matrix to create a packed layer represented by a packed matrix, the packed matrix having non-zero values of the matrix grouped together along at least one of a row or a column of the matrix, blocking the packed layer into a blocked layer, the blocking performed by dividing the non-zero values in the packed matrix into blocks, fusing the blocked layer into a pipeline, and packaging the pipeline into a binary.

Example 14 includes the method of example 13, wherein the execution constraint is a hardware constraint.

Example 15 includes the method of example 14, wherein the hardware constraint represents a bit-width capability of a hardware device that is to execute the machine learning model.

Example 16 includes the method of example 13, wherein the fusing of the blocked layer into the pipeline includes inserting a quantization root into the pipeline.

Example 17 includes the method of example 16, wherein the quantization root is to cause a scheduler to quantize a result of an activation function into a set of bins, pack the values of the bins to create a reduced buffer, and provide the reduced buffer to a pooling function via a remapped load function.

Example 18 includes the method of example 13, further including performing a transformation of the layer of the machine learning model prior to quantizing the layer.

Example 19 includes an apparatus to optimize execution of machine learning models, the apparatus comprising means for quantizing to quantize a layer of a machine learning model based on an execution constraint, the layer of the machine learning model represented by a matrix, means for packing the quantized layer of the matrix to create a packed layer represented by a packed matrix, the packed matrix having non-zero values of the matrix grouped together along at least one of a row or a column of the matrix, means for blocking the packed layer into a blocked layer, the blocking performed by dividing the non-zero values in the packed matrix into blocks, means for fusing the blocked layer into a pipeline, and means for packaging the pipeline into a binary. The example means for quantizing is implemented by the example quantizer 235. The example means for packing is implemented by the example packer 240. The example means for blocking is implemented by the example blocker 245. The example means for fusing is implemented by the example fuser 250. The example means for packaging is implemented by the example packager 255.

Example 20 includes the apparatus of example 19, wherein the execution constraint is a hardware constraint.

Example 21 includes the apparatus of example 20, wherein the hardware constraint represents a bit-width capability of a hardware device that is to execute the machine learning model.

Example 22 includes the apparatus of example 19, wherein the fusing of the blocked layer into the pipeline includes inserting a quantization root into the pipeline.

Example 23 includes the apparatus of example 22, wherein the quantization root is to cause a scheduler to quantize a result of an activation function into a set of bins, pack the values of the bins to create a reduced buffer, and provide the reduced buffer to a pooling function via a remapped load function.

Example 24 includes the apparatus of example 19, further including means for performing a transformation of the layer of the machine learning model prior to quantizing the layer. The example means for performing is implemented by the example transformer 230.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to optimize execution of machine learning models, the apparatus comprising:
   a quantizer to quantize a layer of a machine learning model based on an execution constraint, the layer of the machine learning model represented by a matrix;
   a packer to pack the quantized layer of the matrix to create a packed layer represented by a packed matrix, the packed matrix having non-zero values of the matrix grouped together along at least one of a row or a column of the matrix;
   a blocker to block the packed layer into a blocked layer, the blocking performed by dividing the non-zero values in the packed matrix into blocks;
   a fuser to fuse the blocked layer into a pipeline; and
   a packager to package the pipeline into a binary.

2. The apparatus of claim 1, wherein the execution constraint is a hardware constraint.

3. The apparatus of claim 2, wherein the hardware constraint represents a bit-width capability of a hardware device that is to execute the machine learning model.

4. The apparatus of claim 1, wherein the fuser is further to insert a quantization root into the pipeline.

5. The apparatus of claim 4, wherein the quantization root is to cause a scheduler to:
   quantize a result of an activation function into a set of bins;
   pack the values of the bins to create a reduced buffer; and
   provide the reduced buffer to a pooling function via a remapped load function.

6. The apparatus of claim 1, further including a transformer to perform a transformation of the layer of the machine learning model prior to the quantizer quantizing the layer.

7. At least one non-transitory machine readable storage medium comprising instructions that, when executed, cause at least one processor to at least:
   quantize a layer of a machine learning model based on an execution constraint, the layer of the machine learning model represented by a matrix;
   pack the quantized layer of the matrix to create a packed layer represented by a packed matrix, the packed matrix having non-zero values of the matrix grouped together along at least one of a row or a column of the matrix;
   block the packed layer into a blocked layer, the blocking performed by dividing the non-zero values in the packed matrix into blocks;
   fuse the blocked layer into a pipeline; and
   package the pipeline into a binary.

8. The at least one machine readable storage medium of claim 7, wherein the execution constraint is a hardware constraint.

9. The at least one machine readable storage medium of claim 8, wherein the hardware constraint represents a bit-width capability of a hardware device that is to execute the machine learning model.

10. The at least one machine readable storage medium of claim 7, wherein the instructions, when executed, further cause the at least one processor to insert a quantization root into the pipeline.

11. The at least one machine readable storage medium of claim 10, wherein the quantization root is to cause a scheduler to:
quantize a result of an activation function into a set of bins;
pack the values of the bins to create a reduced buffer; and
provide the reduced buffer to a pooling function via a remapped load function.

12. The at least one machine readable storage medium of claim 7, wherein the instructions, when executed, cause the at least one processor to perform a transformation of the layer of the machine learning model prior to the quantization of the layer.

13. A method to optimize execution of machine learning models, the method comprising:
quantizing a layer of a machine learning model based on an execution constraint, the layer of the machine learning model represented by a matrix;
packing the quantized layer of the matrix to create a packed layer represented by a packed matrix, the packed matrix having non-zero values of the matrix grouped together along at least one of a row or a column of the matrix;
blocking the packed layer into a blocked layer, the blocking performed by dividing the non-zero values in the packed matrix into blocks;
fusing the blocked layer into a pipeline; and
packaging the pipeline into a binary.

14. The method of claim 13, wherein the execution constraint is a hardware constraint.

15. The method of claim 14, wherein the hardware constraint represents a bit-width capability of a hardware device that is to execute the machine learning model.

16. The method of claim 13, wherein the fusing of the blocked layer into the pipeline includes inserting a quantization root into the pipeline.

17. The method of claim 16, wherein the quantization root is to cause a scheduler to:
quantize a result of an activation function into a set of bins;
pack the values of the bins to create a reduced buffer; and
provide the reduced buffer to a pooling function via a remapped load function.

18. The method of claim 13, further including performing a transformation of the layer of the machine learning model prior to quantizing the layer.

19. An apparatus to optimize execution of machine learning models, the apparatus comprising:
means for quantizing to quantize a layer of a machine learning model based on an execution constraint, the layer of the machine learning model represented by a matrix;
means for packing the quantized layer of the matrix to create a packed layer represented by a packed matrix, the packed matrix having non-zero values of the matrix grouped together along at least one of a row or a column of the matrix;
means for blocking the packed layer into a blocked layer, the blocking performed by dividing the non-zero values in the packed matrix into blocks;
means for fusing the blocked layer into a pipeline; and
means for packaging the pipeline into a binary.

20. The apparatus of claim 19, wherein the execution constraint is a hardware constraint.

21. The apparatus of claim 20, wherein the hardware constraint represents a bit-width capability of a hardware device that is to execute the machine learning model.

22. The apparatus of claim 19, wherein the fusing of the blocked layer into the pipeline includes inserting a quantization root into the pipeline.

23. The apparatus of claim 22, wherein the quantization root is to cause a scheduler to:
quantize a result of an activation function into a set of bins;
pack the values of the bins to create a reduced buffer; and
provide the reduced buffer to a pooling function via a remapped load function.

24. The apparatus of claim 19, further including means for performing a transformation of the layer of the machine learning model prior to quantizing the layer.

* * * * *